May 7, 1929.  W. HEALD  1,711,495

DEVICE FOR FEEDING FUEL MIXTURES TO INTERNAL COMBUSTION ENGINES

Filed Feb. 17, 1927

INVENTOR
William Heald
Parker & Carter ATTYS.

Patented May 7, 1929.

1,711,495

UNITED STATES PATENT OFFICE.

WILLIAM HEALD, OF LA PORTE, INDIANA.

DEVICE FOR FEEDING FUEL MIXTURES TO INTERNAL-COMBUSTION ENGINES.

Application filed February 17, 1927. Serial No. 169,053.

This invention relates to improvements in devices for feeding fuel mixtures to internal combustion engines and has for its object to provide a new and improved device of this description.

The invention has, as a further object, to provide a feeding device of this description which will provide a more complete and better vaporization of the liquid fuel.

The invention has, as a further object, to provide a device for feeding the fuel mixture to internal combustion engines arranged so as to increase the efficiency of such engines and secure a greater mileage for the liquid fuel used, when the invention is used in connection with an automobile.

The invention has further objects which are more particularly pointed out in the accompanying description.

Referring now to the drawings.

Like numerals refer to like parts throughout the several figures.

Figure 1:
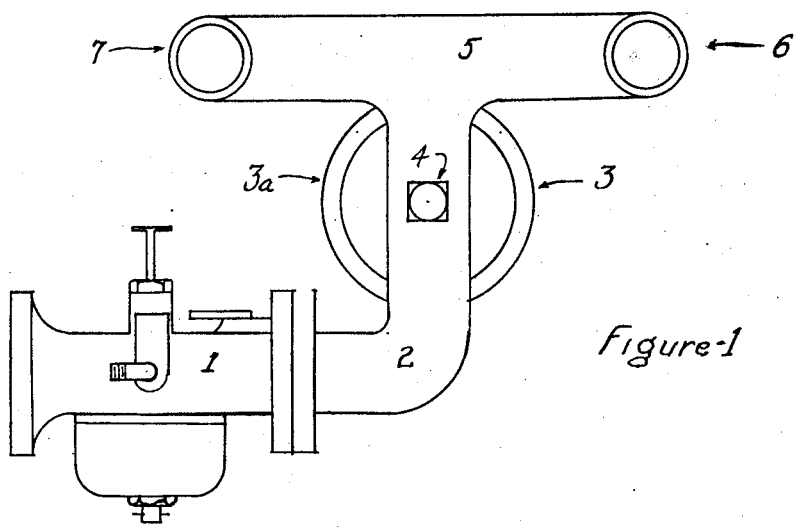
Fig. 1 is a view of one form of feeding device embodying the invention.
Figure 2:
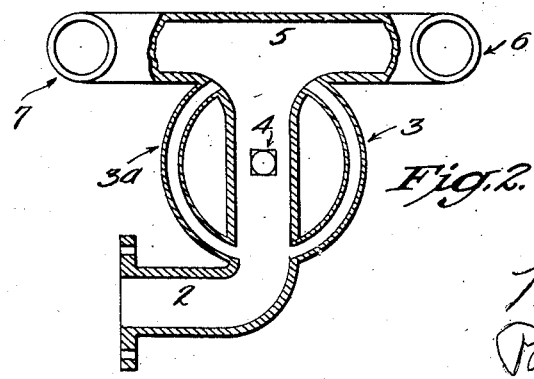
Fig. 2 is a sectional view therethrough.

Referring now to the drawings, I have shown a device in Figs. 1 and 2 to be used in connection with any of the usual carbureters now in use, such as the carbureter 1. Connected with this carbureter, so as to receive the fuel mixture, is a pipe or conduit 2 through which the fuel mixture passes. This conduit leads to the internal combustion engine. Associated with this conduit are means for separating the fuel mixture into different streams and then bringing them together in angular relationship so that the streams impact, as it were, that is, one is injected into another. I have found that by means of such a device, whereby separated streams of the fuel mixture are brought together, the efficiency of the engines is greatly increased and the mileage per unit of liquid fuel used, greatly increased.

Referring now to Figs. 1 and 2 wherein I have shown one means of securing this result, I provide one or more auxiliary conduits 2, 3ª etc., which communicate with the conduit 2 so as to receive material therefrom. These conduits are connected with the main conduit or are arranged so that the fuel mixture therein, after being separated, is again brought into contact with another stream of the fuel mixture. In Figs. 1 and 2 these auxiliary conduits communicate with the main conduit so that there are a plurality of streams of fuel mixture brought together, preferably at an angular relationship, one stream, for example, being injected into another, preferably at an angle. The combined streams are then conducted to the engine.

In order to insure the diversion of a proper amount of the fuel mixture through the auxiliary conduits, I may decrease the effective cross sectional area of the conduit 2 beyond the ends of the auxiliary conduits. This may be accomplished by reducing the size of the conduit 2 at some point beyond the ends of the auxiliary conduits, or by inserting an obstructing device 4 into the conduit 2 at some point beyond the ends of the auxiliary conduits. This obstructing device is preferably an adjustable device which can be adjusted to secure the desired results.

In the drawings I have shown it as consisting of a screw threaded member working in a screw threaded hole in the conduit 2. The conduit 2 communicates with a conduit 5 which conducts the mixture to the cylinders of the internal combustion engine, the cylinders being connected with the ends 6 and 7 of the conduit 5. This conduit may be of any desired construction and arrangement and is herein shown as extending laterally with relation to the main conduit 2.

This feeding device may be used in connection with any internal combustion engine and it is particularly adapted for those used on automobiles. Its arrangement will depend on the conditions presented and this is particularly true in adapting it to different engines of different makes.

Figure 3:
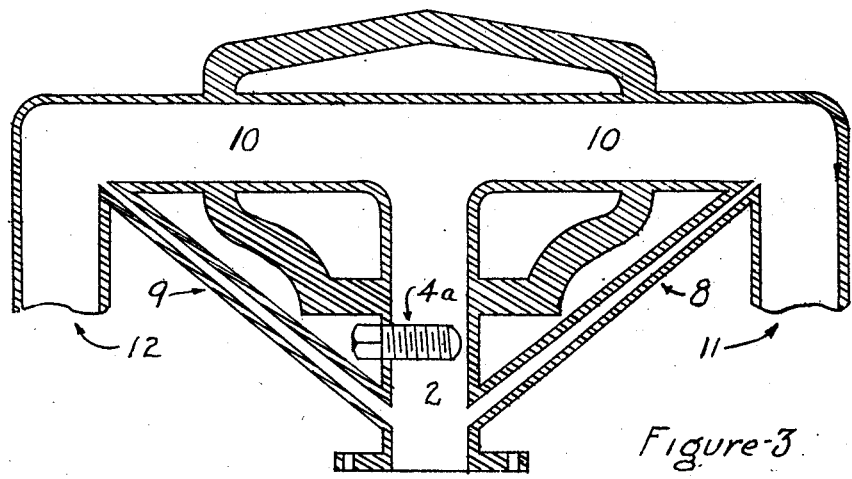
Fig. 3 is a view showing a modified construction.

In Fig. 3 I have shown another construction adapted for use with a different engine. The main conduit conducts the fuel mixture to the engine cylinders and has bent portions 10 connected with the part 2 and bent portions 11 and 12 connected with the part 10. In this construction, the part 2 of the conduit which connects with the carbureter has leading therefrom, the auxiliary conduits 8 and 9. These auxiliary conduits are differently arranged from those shown in Fig. 2.

In this construction, the fuel mixture passing through the part 2 enters the part 10. The end 11 of this conduit conveys the fuel mixture to one cylinder or set of cylinders, and the end 12 conveys it to another cylinder or set of cylinders. The conduit 8 connects with the part 10 at the bent portion thereof and near the end 11 and the conduit 9 connects with the conduit 10 at the bent portion thereof near the end 12. A suitable obstructing device 4ª is used in the conduit so as to insure the proper diversion of the fuel mixture into the auxiliary conduit.

The discharge ends of the auxiliary conduits may be arranged so that the cross sectional areas of the discharge openings thereof are smaller than the main openings so that an injector or nozzle effect is secured. Such a construction is shown in Fig. 3. The stream from the auxiliary conduit is preferably arranged to enter the main stream of material at a bend, that is, at a point where the direction is changing. I have described in detail certain particular constructions embodying my invention but it is, of course, evident that the parts may be varied in many particulars without departing from the spirit of the invention as embodied in the claims hereto appended, and I, therefore, do not limit myself to the particular construction shown.

The use and operation of my invention are as follows:

When the device is in use, it is connected between the carbureter and cylinders of the invention. The suction of the engine cylinders causes the fuel mixture to pass into the conduit 2. Portions of this fuel mixture then pass through the auxiliary conduits, the fuel mixture thus being divided into separated streams. These streams are then brought together so that one is injected into another and this increases the efficiency of the fuel mixture when it enters the engine cylinders.

This mixture of the streams of the fuel mixture assists in securing a better vaporization of the liquid fuel and a better mixture of the liquid fuel with the air, and greatly increases the efficiency of the fuel used and the mileage per unit of fuel when the device is used in connection with automobiles.

I claim:

1. A device for feeding fuel mixtures to internal combustion engines comprising a main conduit having a bent portion and adapted to be connected with the source of fuel supply, an auxiliary conduit leading from said main conduit and having its discharge end connected with said main conduit at a bent portion thereof and where the material in said main conduit is flowing across said discharge end, said discharge end of said auxiliary conduit being nearer the engine cylinder than the inlet end.

2. A device for feeding fuel mixtures to internal combustion engines comprising a main conduit, a plurality of auxiliary conduits leading therefrom, said auxiliary conduits connecting with the main conduit that conveys the fuel mixture to the engine, means in said main conduit intermediate the ends of said auxiliary conduits for obstructing the flow of material through the main conduit, said auxiliary conduits having discharge openings smaller than the main openings therethrough so as to secure an injector effect.

3. A device for feeding fuel mixtures to internal combustion engines comprising a main conduit adapted to be connected with the source of fuel supply, an auxiliary conduit leading from said main conduit and connecting with said main conduit having its discharge end connected therewith at a point nearer the engine cylinder than its inlet end and an adjustable projecting part projecting into said main conduit intermediate the inlet and discharge ends of said auxiliary conduit, the fuel mixture passing simultaneously through the main conduit and the auxiliary conduit, the portion of the fuel mixture passing through the auxiliary conduit being discharged into the portion of fuel mixture passing through the main conduit.

4. A device for feeding fuel mixtures to internal combustion engines comprising a main conduit adapted to be connected with the carbureter of the engine, a plurality of auxiliary conduits connecting with said main conduit for receiving fuel mixture at one part of the conduit and discharging it into another part of the conduit, the auxiliary conduits being smaller at the ends where they discharge into the main conduit than at their other ends so as to secure an injector effect.

5. A device for feeding fuel mixtures to internal combustion engines comprising a main conduit adapted to be connected with the carbureter of an engine, and having bent portions, a plurality of auxiliary conduits, each auxiliary conduit being connected to the main conduit at two separated points, one of said points being at the bent portions of the main conduit.

Signed at Chicago, county of Cook and State of Illinois, this fifteenth day of February, 1927.

WILLIAM HEALD.